(12) United States Patent
Balasa Ramnath et al.

(10) Patent No.: US 10,078,649 B2
(45) Date of Patent: *Sep. 18, 2018

(54) PRE-CACHING OF RELATIONAL DATABASE MANAGEMENT SYSTEM BASED ON DATA RETRIEVAL PATTERNS

(71) Applicant: International Business Machines Corporation, Armonk, NY (US)

(72) Inventors: Santhosh K. Balasa Ramnath, Dublin (IE); Ken Maycock, Lucan (IE); Joseph M. McAndrew, Kildare (IE); Niambh Scullion, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 59 days.

This patent is subject to a terminal disclaimer.

(21) Appl. No.: 14/715,800

(22) Filed: May 19, 2015

(65) Prior Publication Data

US 2016/0132540 A1 May 12, 2016

Related U.S. Application Data

(63) Continuation of application No. 14/535,948, filed on Nov. 7, 2014.

(51) Int. Cl.
*G06F 17/30* (2006.01)

(52) U.S. Cl.
CPC .. *G06F 17/30336* (2013.01); *G06F 17/30339* (2013.01); *G06F 17/30595* (2013.01)

(58) Field of Classification Search
CPC ......... G06F 17/30336; G06F 17/30339; G06F 17/30595

See application file for complete search history.

(56) References Cited

U.S. PATENT DOCUMENTS

| | | | |
|---|---|---|---|
| 5,668,987 A * | 9/1997 | Schneider | G06F 12/0802 |
| 5,765,159 A | 6/1998 | Srinivasan | |
| 6,470,344 B1 * | 10/2002 | Kothuri | G06F 17/30592 707/696 |
| 6,539,382 B1 | 3/2003 | Byrne et al. | |
| 7,120,773 B2 * | 10/2006 | Yoshioka | G06F 12/0238 711/154 |
| 7,499,909 B2 | 3/2009 | Liu et al. | |

(Continued)

OTHER PUBLICATIONS

Bhatia et al., "Sequential prefetch cache sizing for maximal hit rate", 2010 IEEE International Symposium on Modeling, Analysis & Simulation of Computer and Telecommunication Systems (MASCOTS), Aug. 17-19, 2010, Miami Beach, FL, pp. 89-98, DOI: 10.1109/MASCOTS.2010.18.

(Continued)

*Primary Examiner* — Mark D Featherstone
*Assistant Examiner* — Faezeh Forouharnejad
(74) *Attorney, Agent, or Firm* — Daniel R. Simek

(57) ABSTRACT

A processor tracks a frequency of access requests of a first index corresponding to a first data page of a plurality of data pages stored in a database. The processor determines the first index corresponding to the first data page having a frequency of access requests that exceeds a configurable target, and the processor retains, with preference, the first data page that corresponds to the first index, within the cache memory.

9 Claims, 4 Drawing Sheets

(56) References Cited

U.S. PATENT DOCUMENTS

| | | | |
|---|---|---|---|
| 7,647,452 B1* | 1/2010 | Moll | G06F 12/0802 711/118 |
| 7,912,838 B2 | 3/2011 | Hrle et al. | |
| 8,166,248 B2 | 4/2012 | Provenzano et al. | |
| 8,583,874 B2 | 11/2013 | Dubrovin et al. | |
| 2005/0198062 A1* | 9/2005 | Shapiro | G06F 17/30339 |
| 2006/0212658 A1 | 9/2006 | Hrle et al. | |
| 2008/0243761 A1* | 10/2008 | Guo | G06F 17/30306 |
| 2010/0257181 A1 | 10/2010 | Zhou et al. | |
| 2013/0275685 A1 | 10/2013 | Barbas et al. | |
| 2014/0149675 A1* | 5/2014 | Accapadi | G06F 12/0891 711/133 |
| 2015/0186051 A1* | 7/2015 | Gurajada | G06F 3/0611 711/113 |

OTHER PUBLICATIONS

Bringas et al., "Database and Expert Systems Applications", 21st International Conference, DEXA 2010, Aug. 30-Sep. 3, 2010, Bilbao, Spain, pp. 358, 360, 363, 366, 364.

Frank et al., "Adaptive and Automated Index Selection in RDBMS", 3rd International Conference on Extending Database Technology, Mar. 23-27, 1992, Vienna, Austria, pp. 277-292, DOI: 10.1007/BFb0032437.

Han et al., "A Formal Framework for Prefetching Based on the Type-Level Access Pattern in Object-Relational DBMSs", IEEE Transactions on Knowledge and Data Engineering, vol. 17, No. 10, Oct. 2005, pp. 1436-1448, © 2005 IEEE.

Lempel et al., "Predictive caching and prefetching of query results in search engines", Proceedings of the 12th International Conference on Word Wide Web, WWW '03, pp. 19-28, ACM, New York, NY © 2003, doi>10.1145/775152.775156.

Li et al., "TaP: Table-based Prefetching for Storage Caches", FAST '08: 6th USENIX Conference on File and Storage Technologies, Feb. 26-29, 2008, pp. 81-96.

Kolaczkowski et al., "Automatic Index Selection in RDBMS by Exploring Query Execution Plan Space", Advances in Data Management, pp. 3-24, Copyright 2009, DOI: 10.1007/978-3-642-02190-9_1.

Prakash et al., "Efficient XML Query Processing in RDBMS Using GUI-Driven Prefetching in a Single-User Environment", 12th International Conference on Database Systems for Advanced Applications, DASFAA 2007, Apr. 9-12, 2007, Bangkok, Thailand, pp. 819-833, Copyright 2007, DOI: 10.1007/978-3-540-71703-4_68.

Prakash et al., "Efficient XML Query Processing in RDMS Using GUI-driven Prefetching in a Single-User Environment", provided in Main Idea of Disclosure dated Jan. 13, 2014, pp. 1-19.

"Readahead prefetching", DB2 Version 10.1 for Linux, UNIX, and Windows, IBM Knowledge Center, provided in Post Disclosure dated Apr. 23, 2014, 1 page, <http://www-01.ibm.comisupport/knowledgecenter/SSEPGG_10.1.0/com.ibm.db2.luw.admin.perf.doc/doc/c0058907.html>.

"Pre-Caching of Relational Database Management System Based on Data Retrieval Patterns ", U.S. Appl. No. 14/535,948, filed Nov. 7, 2014, pp. 1-32.

IBM Appendix P, list of IBM patents or patent applications treated as related, pp. 1-2.

* cited by examiner

US 10,078,649 B2

PRE-CACHING OF RELATIONAL DATABASE MANAGEMENT SYSTEM BASED ON DATA RETRIEVAL PATTERNS

BACKGROUND OF THE INVENTION

The present invention relates generally to the field of database performance, and more particularly to maintaining high-demand retrieval data in cache.

In data oriented environments, data access often exhibits patterns of behavior. For example, data access requests related to tickets to a certain concert that have just gone on sale, the latest new movie recording release, and sales of airline tickets as a holiday approaches; all point towards elements of certain database tables and data that will be more frequently accessed than other portions of data. Current relational database management systems (RDBMS), and specifically, pre-caching methodologies often don't recognize and adapt to these trends in the most efficient way.

Many RDBMSs include indexing technology that enables sub-linear data lookup to improve performance, as linear search is inefficient for large databases. In simplistic terms a database index is best compared to that of an index of a book, which allows one to determine a page to directly turn to, to find the topic or information of interest, rather than having to read sequentially through the book to find particular information.

RDBMS performance is tightly integrated to the location of where the data is stored. If the data is to be retrieved from physical disk it is significantly slower than direct retrieval from machine cache; in some cases from ten thousand to one million times slower. Within todays RDBMS engines there are some techniques to attempt to improve latency issues of retrieval from physical disk; however, they have limited effectiveness.

SUMMARY

According to one embodiment of the present invention, a method for retention of content in cache memory of a database. A processor tracks a frequency of access requests of a first index corresponding to a first data page of a plurality of data pages stored in a database. The processor determines the first index corresponding to the first data page having a frequency of access requests that exceeds a configurable target, and the processor retains, with preference, the first data page that corresponds to the first index, within the cache memory.

DETAILED DESCRIPTION

Figure 1:
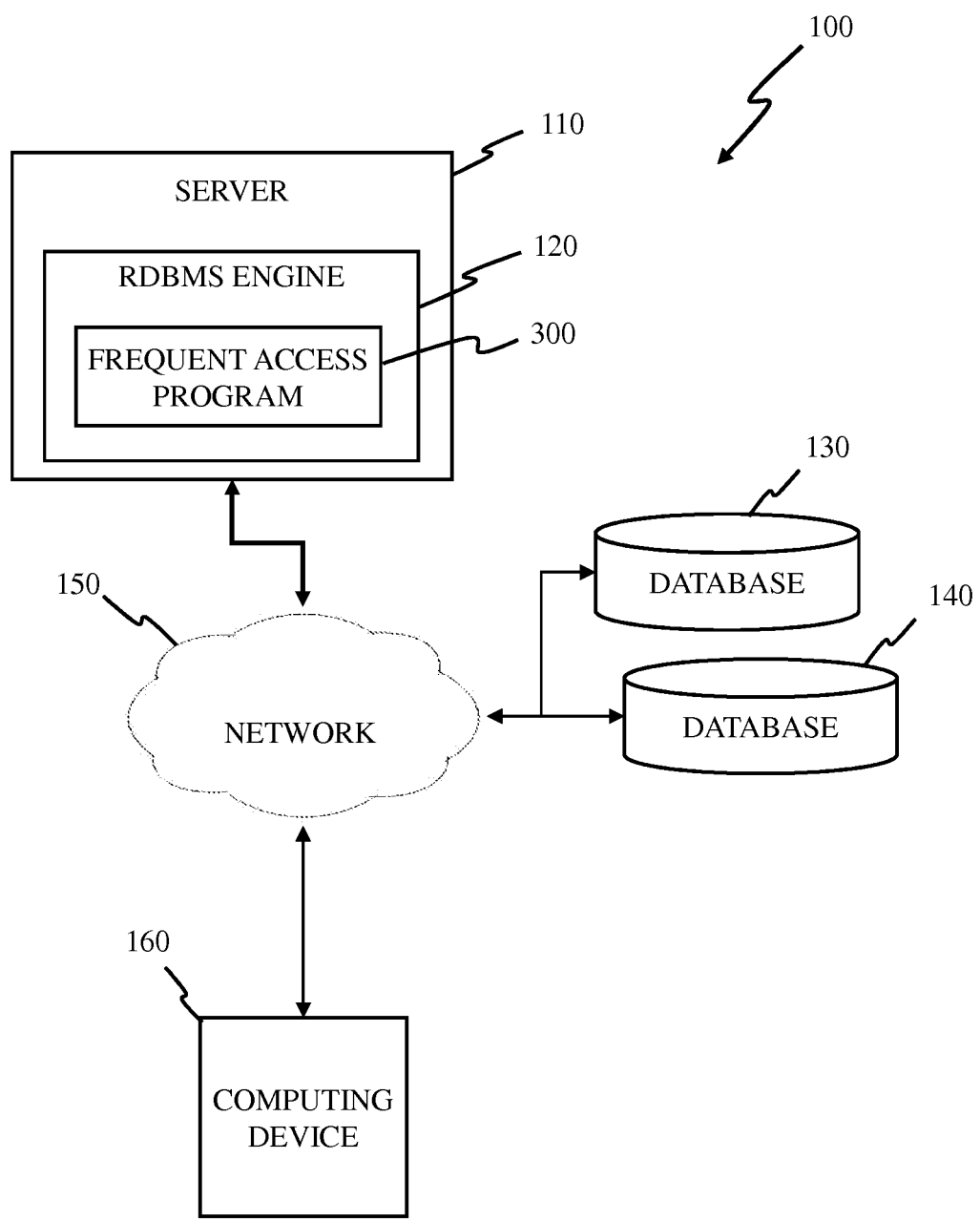
FIG. 1 is a functional block diagram illustrating a distributed data processing environment, in accordance with an embodiment of the present invention.

At the most basic level an index is a copy of select columns from a table that can be searched very efficiently that also includes a low level disk block address to direct link to the complete row of data it was copied from. In effect the index is significantly smaller than the actual table in question and as such minimal disk access from disk is required to read in the full index. Once parsed, a pointer to the appropriate location containing the desired data is attained allowing reading of the directly relevant data to be executed. Embodiments of the present invention recognize that the current usage and utilization of indexes by an RDBMS does not facilitate pre-caching and pre-fetching models. Embodiments of the present invention utilize existing indexes and include frequency of usage information to determine the portions of the index that reference frequently accessed data. This allows identification of data pages that are ideal candidates to include in pre-caching to maximize cache hits, reduce disk input-output, and increasing RDBMS performance.

Embodiments of the present invention prioritize data to be maintained in cache, based on a frequency of access request, and therefore improve database performance through reduced disk input-output (I/O) wait time. Embodiments enhance RDBMS index capabilities to profile the most requested portions of an index and keep the corresponding data pages pre-cached.

To give more context to the invention it is important to understand how data is physically stored inside an RDBMS. A database can be composed of many tablespaces, which in turn can contain one or more tables, which in turn can have multiple indexes. The invention would enhance and track index utilization and specifically which portions of indexes are accessed most frequently, allowing the identification of index portions frequently accessed. This data will then be automatically pre-cached. Often, caches or buffer pools of RDBMSs remove data on a first in first out (FIFO) basis. The duration of time in which data is retained in a buffer pool may vary depending on the size of the buffer pool in question and the level of activity of the database. Embodiments of the present invention prioritizes data that is likely to be used again soon, designating not to remove, or "expire" the data from the buffer pool as readily as other data less frequently accessed.

Embodiments of the present invention include index entries that have a corresponding large quantity of access requests within a designated period of time, or a large access frequency. As a query is submitted to the database it is parsed via the optimizer to identify the most efficient execution plan based on various criteria. The query is then executed by the RDBMS engine. During this processing the appropriate data pages required to service the query (request) are read from cache and / or disk and passed into the buffer pool. These data pages will often be rapidly identified via the use of indexes of tables. The RDBMS engine is updated to log the data page address that was requested for each query arriving to the database. The address data is also logged into a new data structure, referred to as the frequency access index manager (FAIM), which tracks the access requests of data and determines if the frequency of access exceeds a configurable frequency limit, and doing so, adds the index entry, or address of the frequently accessed data page, to the frequent access index (FAI). The FAI is interrogated by the buffer pool and the index entries of the FAI receive a priority to remain in the buffer pool (cache), based on the frequency level of the index entry and expiration of the index entry from the FAI.

The present invention will now be described in detail with reference to the Figures. FIG. 1 is a functional block diagram illustrating a distributed computer processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed computer processing environment 100 includes server 110, which is depicted hosting relational database management system (RDBMS) engine 120, and frequent access program 300, databases 130 and 140, and computing device 160, all interconnected via network 150.

Network 150 can be, for example, a local area network (LAN), a telecommunications network, a wide area network (WAN), such as the Internet, a virtual local area network (VLAN), or any combination that can include wired, wireless, or fiber optic connections. In general, network 150 can be any combination of connections and protocols that will support communications between server 110, computing device 160, databases 130 and 140, and other components of distributed computer processing environment 100 (not shown), in accordance with embodiments of the present invention.

In some embodiments of the present invention, computing device 160 may be a desk top computing device, a rack mounted computing device, a blade server, a management server, a mobile computing device, or any other electronic device or computing system capable of performing program instructions, and receiving and sending data. In other embodiments, computing device 160 may represent a computing system utilizing multiple computers as a server system, such as in a cloud computing environment. In yet other embodiments, computing device 160 may be a laptop computer, a tablet computer, a netbook computer, a personal computer (PC), a personal digital assistant (PDA), a smart phone, or any programmable electronic device capable of communicating with server 110 and databases 130 and 140, via network 150. In another embodiment, computing device 160 may be a computing system utilizing clustered computers and components (e.g., database server computer, application server computers, etc.) that act as a single pool of seamless resources when accessed within distributed computer processing environment 100. Computing device 160 may include internal and external hardware components, as depicted and described with reference to FIG. 4.

Databases 130 and 140 are relational databases. In some embodiments of the present invention, databases 130 and 140 include data organized by table spaces, each table space including one or more tables. The tables are organized into cells of data distinguished by a unique combination of a column and row. Tables may have associated indexes which map the data included in a table, improving the speed in which a particular data page containing particular data, can be retrieved.

Server 110 is depicted as including relation database management system (RDBMS) engine 120, and frequent access program 300. Server 110 operates both RDBMS engine 120 and frequent access program 300. In some embodiments of the present invention, server 110 may be a desk top computing device, a rack mounted computing device, a blade server, a management server, a mobile computing device, or any other electronic device or computing system capable of performing program instructions, and receiving and sending data. In other embodiments, server 110 may represent a computing system utilizing multiple computers as a server system, such as in a cloud computing environment. In yet other embodiments, server 110 may be a laptop computer, a tablet computer, a netbook computer, a personal computer (PC), a desktop computer, a personal digital assistant (PDA), a smart phone, or any programmable electronic device capable of communicating with computing devices 160 and databases 130 and 140, via network 150. In another embodiment, server 110 may be a computing system utilizing clustered computers and components (e.g., database server computer, application server computers, etc.) that act as a single pool of seamless resources when accessed within distributed computer processing environment 100. Server 110 may include internal and external hardware components, as depicted and described with reference to FIG. 4.

RDBMS engine 120 is the operational control of the RDBMS and capable of managing multiple databases. RDBMS engine 120 receives queries, optimizes the search approach, performs the search to access data from pages of database tables, and performs any logic, formatting or other conditional attributes of the data, in preparation for presenting the results of the query. RDBMS engine 120 works in conjunction with frequent access program 300 to manage the cache or buffer pool associated with processing data access requests.

Frequent access program 300 tracks the access request behavior associated with queries to RDBMS engine 120 and identifies the indexes corresponding to data pages that have access request frequencies exceeding a configurable frequency target value. Frequent access program 300 generates a first data structure to track the instances of index access requests corresponding to a data page, and calculates the frequency of instances within a configurable period of time. Frequent access program 300 generates a second data structure and populates the structure with the index entries that have access request frequencies exceeding the configurable target. The second data structure, hereafter referred to as a frequent access index (FAI), is used to preferentially maintain data pages in cache or buffer pool memory, based on the frequent access requests of the data. Retaining the frequently accessed data page in buffer pool memory avoids I/O delays from reading data from disk, and improves database performance.

Figure 2:
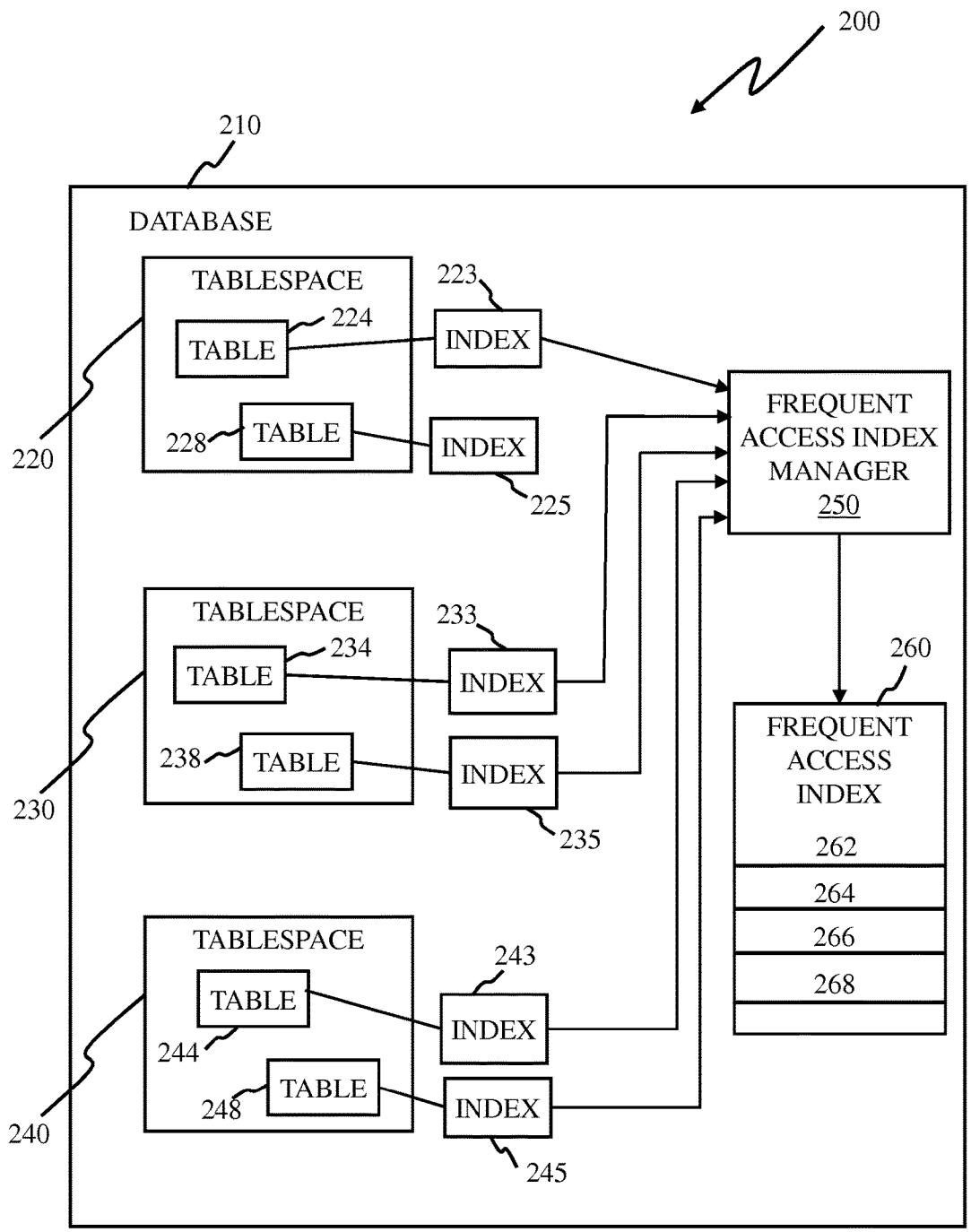
FIG. 2 is a functional block diagram depicting data structure components of a relational database within the data processing environment of FIG. 1, in accordance with an embodiment of the present invention.

FIG. 2 is a functional block diagram depicting data structure components 200 of a relational database within distributed computer processing environment 100 of FIG. 1, in accordance with an embodiment of the present invention.

Some embodiments of the present invention add new components to the RDBMS engine enabling the management of frequent data page access requests. Some embodiments of the present invention include a frequent access program 300 that interacts with an RDBMS and the buffer pool management of the RDMS to maintain high frequency access data pages in the buffer pool memory to avoid I/O reads and writes and improve performance. The access requests are handled by the RDBMS engine, and are received and monitored by frequent access program 300, using a new component structure, referred to in some embodiments as a frequent access index manager (FAIM).

The FAIM is a data structure that maintains tracking data of query access requests of data pages. Frequent access program 300 accesses the tracking data maintained in the FAIM, and determines if the frequency of access requests exceeds a configurable count or target, within a configurable period of time. For example, the FAIM may record the cumulative access requests and the corresponding index of a data page, over a configurable period set at three days. The cumulative access requests for a three day period determine the frequency of access requests, such that on day five, the cumulative access requests of day three, four, and five are used to determine the frequency of access requests at the end of day five. The access requests of days one and two are expired and are no longer considered in determining the frequency of access requests.

The FAIM monitors the count or "hits" for each access request for data within a data page that corresponds to an index entry. The tracking data of the FAIM is used to determine the indexes corresponding to data pages having a frequency of access requests that exceed a configurable target. Frequent access program 300 generates a frequent access index (FAI) data structure, and populates the FAI data structure with a listing of index entries having a frequency of access requests that exceed the configurable frequency target. Thus, based on usage statistics, the FAI includes index entries pointing to high access request data pages. If a required page is already stored within the FAI, then the value indicating the number of "hits" would be incremented in the FAIM, and the frequency of access request for the index in the FAI would be adjusted. If a data page index that qualifies to be included in the FAI, is not within the FAI, the index entry will be added accordingly.

In order to effectively manage index information pointing to data access pages that are being accessed frequently, the index entry information of the FAI will expire after a configurable period of time. This will ensure the FAI landscape will be limited to the period of time that is of interest. For example, each data page access hit may expire after 7 days therefore ensuring the hot data as determined by access request "hits" is limited to data that experiences a high frequency of access demand, exceeding a configurable threshold, over the past 7 days. For example, data access hits occurring on day 1 will expire on day 8 which will affect the access request frequency of the particular index entry information.

Component structure 200 includes database 210, tablespace 220, 230, and 240, database tables 224, 228, 234, 238, 244, and 248, indices 223, 225, 233, 235, 243, and 245, FAIM 250, and FAI 260. FAI 250 includes indexes 262, 264, 266, and 268.

Database 210 is shown to include three tablespaces, tablespace 220, 230, and 240. A tablespace is a storage location where the actual data underlying database objects can be kept. A tablespace provides a layer of abstraction between physical and logical data, and serves to allocate storage for all database management system managed segments. Tablespace 220 is shown to include table 224 and table 228, tablespace 230 is shown to include table 234 and table 238, and tablespace 240 is shown to include table 244 and table 248.

Tables 224, 228, 234, 238, 244, 248 are data structures that include stored data. A database table is a collection of related data held in a structured format consisting of columns and rows, within a database. A table has a specified number of columns, but can have a number of rows up to the limitations of the database application. Table 224 is shown with corresponding index 223. A database table index is a data structure that improves the speed of data retrieval operations on a database table at the cost of additional writes and storage space to maintain the index data structure. Indexes are used to quickly locate data without having to search every row in a database table every time a database table is accessed. Indexes can be created using one or more columns of a database table, providing the basis for both rapid random lookups and efficient access of ordered records. Similarly, table 228 is depicted as having corresponding index 225, table 234 having corresponding index 233, table 238 having corresponding index 235, table 244 having corresponding index 243, and table 248 having corresponding index 245.

Frequent access index manager (FAIM) 250 receives access request information from the RDBMS engine executing the access requests, depicted as arrows from the indexes to FAIM 250. FAIM 250 tracks the hits for each index entry associated with the access request and determines if the frequency of access requests for an index entry exceeds a configurable access target within a configurable period of time. For example, FAIM 250 can be perceived as constructing a "league table" that tracks and ranks the quantity of access requests received for index entries within a 3 day time period. The first time an index entry is requested for access, it is added to the "league table", each subsequent access request for the same index entry increments the quantity of accesses associated with the index entry. The league table determines the frequently accessed index entries that have access frequencies exceeding a configurable access target per a configurable period of time, and populates the frequent access index (FAI) 260 with the index entry information. FAI 260 is interrogated by the buffer pool of the RDBMS and indicates prioritized indexes identifying the data pages to be retained in buffer pool memory. Frequent access index (FAI) 260, includes page index 262, page index 264, page index 266, and page index 268. FAI 260 prioritizes the retention of page indexes 262, 264, 266, and 268, based on their respective frequency of access requests, ranging from the most frequently accessed to the least frequently accessed, all of which have frequencies exceeding the configurable frequency target or threshold. Page indexes 262, 264, 266, and 268, are preferentially kept in the buffer pool on a most-frequent to least-frequent basis.

For example, the configurable count limit of access requests is set to 1000 and the configurable time period is set for 3 days. Access requests for data corresponding to page index 262 is received and accrues 500 hits on day one, 600 hits on day two, 400 hits on day three, 300 hits on day four, and 100 hits on day five. On day two the FAIM determines that page index 262 has an access "hit" count exceeding the limit of 1000 within a three day period, and adds page index to FAI 260, and the buffer pool gives priority to retaining page index 262 in cache memory, to facilitate frequent access requests. On day three the total access count increases to 1500 and the priority of page index 262 increases relative to the access request frequency of the previous days. On day four, the access request hits from day one (500) expire, but the additional 300 hits of day four keep the overall hit total for the three day period at 1300 and page index 262 remains in FAI 260 at perhaps a slightly lower priority to be retained in memory. On day five, the 600 hits of day two expire, and an additional 100 access request hits occur, resulting in an access frequency total of 800 hits, which is less than the configurable target of a count of 1000 hits in a three day period, so page index 262 is removed from FAI 260 and no longer receives priority to be retained in cache memory.

In some embodiments of the present invention, if a large quantity of access demand operations are received in a narrow time period, most or all of the cache may be cleared to handle the large quantity of requests, however, subsequent to completion of the large quantity of access demand operations, pre-fetchers repopulate cache with data associated with the index entries of FAI 260, populating the available cache based on the priority of the index entries of FAI 260 and the available cache capacity.

Figure 3:
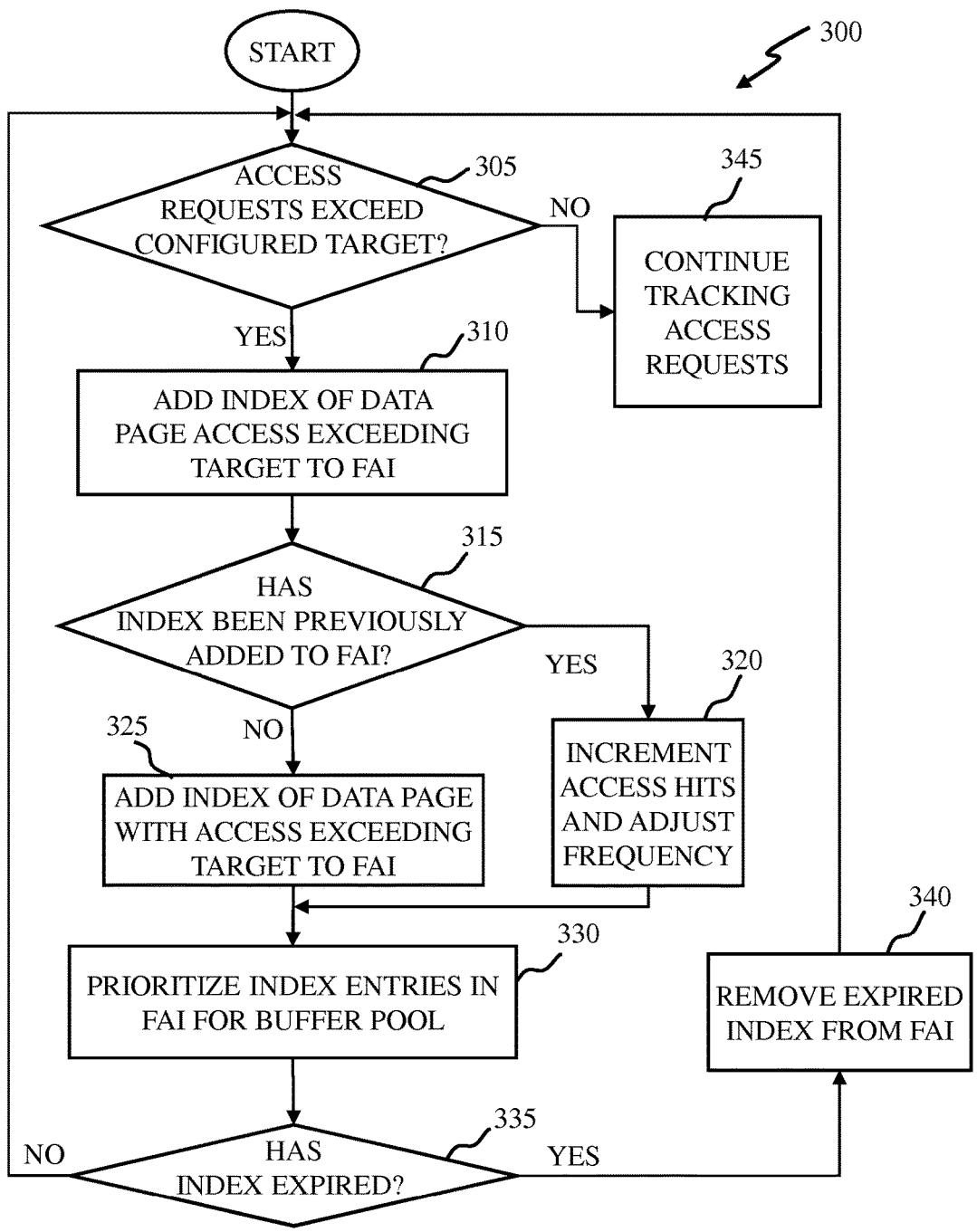
FIG. 3 illustrates operational activities of a frequent access index (FAI) manager program, inserted on a server computing device within the data processing environment of FIG. 1, in accordance with an embodiment of the present invention.

FIG. 3 illustrates operational activities of frequent access program 300, inserted on server 110 within distributed computer processing environment 100 of FIG. 1, in accordance with an embodiment of the present invention. In some embodiments of the present invention, frequent access program 300 receives index entry data associated with data page access for queries run on databases, for example, database 130 and database 140 (FIG. 1). The data page access request data are added to the FAIM and associated with the index corresponding to the data page requested. In some embodiments of the present invention, the data added to the FAIM includes a count or "hit" for each instance of an access request and the date and time data associated with the access request. Frequent access program 300 determines the frequency of access requests for each data page, and associates the frequency with the index entry corresponding to each requested data page.

Frequent access program 300 determines if access request frequency exceeds a configurable target (decision step 305). A target value for the frequency of access requests associated with an index in the frequent access index manager (FAIM) that corresponds to a requested data page, is set as a configurable property of frequent access program 300. In some embodiments, the frequency target setting may be based on known buffer pool capacity, anticipated database query activity, and performance targets of the database system. In other embodiments the frequency target may be a default setting that is adjusted periodically based on query response time.

Determining that the access request frequency of data pages does not exceed the configurable frequency target (step 305, "NO" branch), frequent access program 300 continues to track access requests (step 345). Frequent access program 300 submits an instance of an access requests, or a hit, to the FAIM in which the number of access hits are recorded and the date and time associated with the access request hits. Frequent access program 300 calculates a frequency based on the number of hits of access requests associated with a data page, within a configurable period of time. The FAIM includes the calculated frequency and the corresponding index of the data page accruing the access request hits.

Determining that the access request frequency of data pages does exceed the configurable frequency target, (step 305, "YES" branch), frequent access program 300 adds the index of the data page having access requests exceeding the configurable target, to the frequent access index (FAI) (step 310). The FAI includes only those indexes that have access request frequencies exceeding the configurable target. The FAI is interrogated by the buffer pool and indexes included in the FAI hold a priority for remaining in buffer pool cache memory. A data page in buffer pool memory, whose index is not included in the FAI, is removed from the buffer pool via the regular cast out processes, while data pages whose corresponding indexes are included in the FAI are preferentially maintained in the buffer pool. Indexes in the FAI are associated with a frequency of access request value, and the priority of maintaining a data page having an index included in the FAI, is based on the frequency value associated with the index.

In considering the addition of an index to the FAI, frequent access program 300 determines if the index has been previously added to the FAI (decision step 315). In some embodiments of the present invention, the data page corresponding to the index has been requested numerous times and may have already exceeded the configurable frequency target, and has been previously added to the FAI. In other embodiments, access to the data page corresponding to the index may have been requested for the first time or for a number of times less than the configurable frequency target, within the configurable time period.

Having determined that the data page access request frequency associated with the index of the data page, has previously exceeded the configurable frequency target, and has been previously added to the FAI (step 315, "YES" branch), frequent access program 300 increments the access request hits and adjusts the frequency associated with the index (step 320). The access request hit count within a configurable period of time is used to determine the frequency of access requests. When access requests occur for data pages whose index has been previously added to the FAI, the hit count is incremented, consistent with the instances of additional access requests, and the date and time of the access requests are retained to determine the access request hits occurring within the configurable period of time. For example (referring to FIG. 2), index 262 has been previously added to FAI 260, and an additional 50 hits are observed for the data page corresponding to index 262 within a time period of one hour. The configurable time period for determining the frequency of access requests in the example is set at 24 hours, therefore the additional 50 hits are added to the cumulative number of hits for index 262. The configurable time period advances by one hour to include the 50 hits; however, a one hour time period occurring between the previous $25^{th}$ and $24^{th}$ hours, and the hits that occurred during that hour, are now expired and are not considered in the frequency calculation. Assuming that 10 hits occurred during the expired hour, the net cumulative hits would be an additional 40 hits per the configurable time period for determining frequency of access requests. The net additional hits would have the effect of increasing the frequency, and frequent access program 300 would give a higher priority to the corresponding data page of the index with increased frequency.

Having determined that the data page access request frequency associated with the index of the data page has not previously been added to the FAI (step 315, "NO" branch), frequent access program 300 adds the index of the data page with access frequency exceeding the configurable frequency target, to the FAI (step 325). Frequent access program 300 adds the index corresponding to the data page with a frequency of access requests exceeding the configurable target, and the data page receives a priority of to be maintained in buffer pool memory, based on the frequency value of the index, relative to the frequency value of other indexes in the FAI.

Having added the index of data page access to the FAI, frequent access program 300 prioritizes the index entries in the FAI for the buffer pool (step 330). As time passes, hits occurring at previous times may expire and current time periods may incur different amounts of access requests, resulting in changes to the frequency of access requests for indexes. Frequent access program 300 determines the priorities of indexes within the FAI to establish an order of preference of removing data pages, should buffer pool memory be required for page intensive queries. For example (referring to FIG. 2), index 268 is added to FAI 260, having exceeded the configurable target frequency by one hit. Index 268 is at a lower frequency value relative to indexes 262, 264, and 266, and therefore has a lower priority for maintaining the data page corresponding to index 268 within the buffer pool memory.

Having prioritized the index entries of the FAI, frequent access program 300 determines if an index entry of the FAI has expired (decision step 335). Indexes are added to the FAI based on the calculated frequency of access requests per a configurable period of time. Over time, the access request hits for a data page may decrease or stop altogether, causing the frequency value associated with the data page index to decrease. If the frequency value of an index falls below the frequency target for inclusion within the FAI, the index expires and is removed from the FAI. Subsequent access request activity may result in the index returning to the FAI, depending on whether the frequency target is again exceeded. Frequent access program 300 determines if the frequency value of indexes included in the FAI have fallen below the frequency target value, causing expiration of the index from the FAI.

For example, index 268 is currently included in FAI 260, and has a current access request frequency value that barely exceeds the frequency target of FAI 260. A time period elapses in which there are no additional hits for the data page associated with index 268, and the frequency value falls below the frequency target for including indexes in FAI 260. Frequent access program 300 re-calculates the frequency value of index 268 and determines that the value falls below the target frequency of including indexes in FAI 260, which results in the expiration and removal of index 268 from FAI 260.

Having determined that the indexes of the FAI have not expired (step 335, "NO" branch), frequent access program 300 returns to determine if access requests exceed the configurable frequency target (step 305) and proceeds as described above. Having determined that an index included within the FAI has expired (step 335, "YES" branch), frequent access program 300 identifies the expired data page index and removes the expired index from the FAI (step 340). The expired index is removed from the FAI; however, the hit count, and date and time information associated with the hits, are retained in the FAIM. Frequent access program 300 continues to track access request hits for the expired data page. If subsequently, the access request frequency is determined to again exceed the configurable frequency target, frequent access program 300 adds the index to the FAI, as described above.

Having removed the expired index from the FAI, frequent access program 300 returns to determine if access requests of a data page corresponding to an index, exceed the configurable frequency target (decision step 305), and proceeds as described above.

Some embodiments of the present invention associated with the discussion of FIG. 3, describe a continuously looping operation of frequent access program 300. Some embodiments may configure frequent access program 300 to operate continuously for all database activities. In other embodiments the operation of frequent access program 300 may be limited to coincide with particular events and/or defined time periods, and may otherwise be terminated (not shown).

An essential aspect of existing buffer pool management in a RDBMS is casting out of old pages in the cache to make space for pages required for incoming queries. This is often accomplished by a generic clock algorithm, essentially casting out data pages based on a first-in-first-out (FIFO) type of model. Some embodiments of the present invention include communication of frequent access program 300 with existing buffer pool management operations, the FAIM, and the FAI, during the cast out process to ensure data pages having corresponding access request frequency values exceeding the configurable frequency target, and are therefore included in the FAI, aren't cast out as readily as less frequently accessed pages.

The buffer pool is naturally not a static structure and is constantly in flux with data pages coming in to service queries, which are received by the RDBMS engine, and depending on the volume, complexity, and size of the queries, casting out frequently accessed data pages in the buffer pool may be necessary. A further aspect of frequent access program 300 is to enable existing asynchronous pre-fetchers to prioritize frequently accessed data pages, which have access request frequencies exceeding the configurable frequency target and have been cast out of the buffer pool due to intensive page access queries, are re-populated back into buffer pool memory at the earliest possible opportunity.

Figure 4:
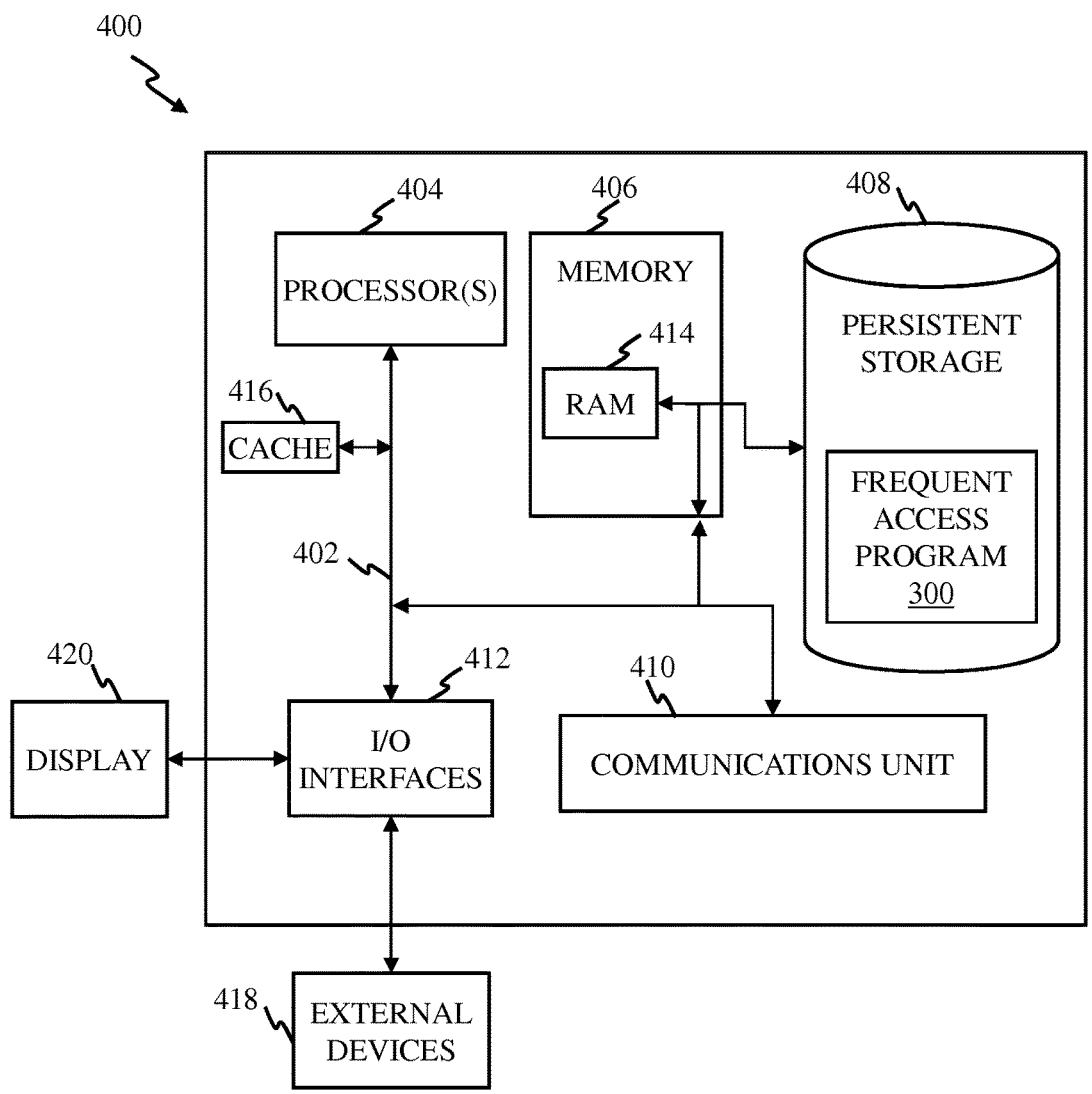
FIG. 4 depicts a block diagram of components of the server computing device capable of executing the cache retaining program of FIG. 3, in accordance with an embodiment of the present invention.

FIG. 4 depicts a block diagram of components of computing device 400 and server computer 110, both capable of executing frequent access program 300, as well as components of computing device 160, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Computing device 400, server 110, and computing device 160 include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Frequent access program 300 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of distributed computer processing environment 100. In these examples, communications unit 410 includes one or more network interface cards. Communications unit 410 may provide communications through the use of either or both physical and wireless communications links. Frequent access program 300 may be downloaded to persistent storage 408 through communications unit 410.

I/O interface(s) 412 allows for input and output of data with other devices that may be connected to computing device 400, server 110, and computing device 160. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., frequent access program 300 can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for retention of content in a cache memory supporting database operations, the method comprising:
    a processor, tracking a frequency of access requests of a first index and a second index of a database corresponding respectively to a first data page and a second data page of a plurality of data pages residing in cache memory;
    the processor, recording in a first data structure, each instance of access requests for the first index and the second index as a count of access requests, including a date and time of each respective instance of access request;
    the processor, determining whether the frequency of access requests of the first index corresponding to the first data page residing in cache memory, and the second index corresponding to the second data page residing in cache memory, respectively, exceeds a target of access request frequency, wherein the frequency of access request is calculated based on the count of access requests within a configurable period of time;
    responsive to determining the frequency of access requests of the first index exceeds the target of access request frequency, and the frequency of access requests of the second index fails to exceed the target of access request frequency, the processor, applying an attribute of priority to the first index to retain the first data page, corresponding to the first index within the cache memory, relative to the second data page that corresponds to the second index, wherein applying the attribute of priority to the first index corresponding to the first data page, further comprises adding the first index and a value of the frequency of access request associated with the first index to a second data structure that includes information associated with indices of respective data pages having frequency of access requests exceeding the target of access request frequency;
    determining a change to the frequency of access request of the first index as a start and an end of the configurable period of time progresses; and
    in response to determining an expiration of the attribute of priority to retain the first index within the cache memory, based on the frequency of access requests associated with the first index falling below the target of access request frequency as the start and the end of the configurable period of time progresses, removing the attribute of priority to retain the first index within the cache memory, by removing the information associated with the first index from the second data structure.

2. The method of claim 1, wherein an instance of the access requests of the first index corresponding to the first data page, expires after the configurable period of time, thereby the instance is excluded from a determination of the frequency of access requests of the first index.

3. The method of claim 1, further comprising:
    the processor, removing the first data page from cache memory, based on a high demand of page access requests;
    the processor, determining that capacity of the cache memory is available; and
    the processor, re-populating the cache memory with the first data page, based on a priority of the first index included in a second data structure, wherein the first index is associated with a greater frequency of access requests than other indexes included in the second data structure.

4. The method of claim 1, wherein tracking the frequency of access requests of the first index and the second index corresponding respectively to the first data page and the second data page of a plurality of data pages residing in cache memory further comprises:
    determining, respectively, a cumulative number of instances of access requests of the first index and the second index, requested within the configurable period of time; and
    adding a new unit of time to the configurable period of time, wherein new access requests occurring within the new unit of time are added to the cumulative number of instances of access requests for each of the first index and second index, respectively, and wherein the least recent unit of time of the configurable period of time is excluded from the configurable period of time, and the access requests occurring within the least recent unit of time of the configurable period of time are excluded from the cumulative number of instance of access requests for each of the first index and second index, respectively.

5. The method of claim 1, wherein applying an attribute of priority to retain in cache memory the first data page that corresponds to the first index, further comprises:

the processor determining whether the cache memory includes sufficient unoccupied memory for an addition of a third data page to the cache memory; and responsive to determining insufficient unoccupied memory for the addition of the third data page to the cache memory, the processor removing the second data page, corresponding to the second index, from the cache memory, as a priority relative to the first data page, based on the attribute of priority designated to the first data page, wherein the attribute of priority is based on the frequency of access requests of the first index corresponding to the first data page exceeding the target of access request frequency.

6. The method of claim 1, wherein the frequency of access requests of the first index and the second index that are tracked are stored in a frequency access index manager as the first data structure, and wherein applying an attribute of priority to retain in cache memory the first data page that corresponds to the first index, includes retaining the first data page at a current memory address within the cache memory as entered into the frequency access index manager.

7. The method of claim 1, wherein responsive to determining the frequency of access requests of the first index exceeds the target of access request frequency, the processor adding an address corresponding to the first data page residing in the cache memory from a frequency access index manager data structure, to a frequent access index data structure, wherein the frequent access index includes the address of the first data page within the cache memory, having a frequency of access requests exceeding the target of access request frequency.

8. The method of claim 1, further comprising:

responsive to removing from cache memory, data pages having frequency of access requests exceeding the target, due to high demand of access requests clearing a portion of the cache memory, the processor repopulating the cache memory with data pages that were removed, based on the frequency of access requests associated with respective data pages, subsequent to an availability of at least part of the portion of the cache memory, wherein the data pages having a greater frequency of access requests that were removed are repopulated in the cache memory as a priority over data pages having a lesser frequency of access requests.

9. The method of claim 1, further comprising:

responsive to determining the frequency of access requests of the first index and the second index both exceed the target of access request frequency, and the frequency of access requests of the first index exceeds the frequency of access requests of the second index, the processor applying an attribute of priority to retain the first data page within the cache memory, relative to the second data page that corresponds to the second index, wherein the attribute of priority is added to a second data structure which includes for each index added to the second data structure, respective addresses of data pages residing in cached memory corresponding to a value of access request frequency that exceeds the target.

* * * * *